(12) United States Patent
Anderle et al.

(10) Patent No.: US 8,427,573 B2
(45) Date of Patent: Apr. 23, 2013

(54) METHOD FOR FOCUSING A FILM SCANNER AND FILM SCANNER FOR CARRYING OUT THE METHOD

(75) Inventors: Klaus Anderle, Darmstadt (DE); Markus Hasenzahl, Riedstadt (DE)

(73) Assignee: GVBB Holdings S.A.R.L., Luxembourg (LU)

( * ) Notice: Subject to any disclaimer, the term of this patent is extended or adjusted under 35 U.S.C. 154(b) by 1457 days.

(21) Appl. No.: 11/401,342

(22) Filed: Apr. 10, 2006

(65) Prior Publication Data

US 2006/0227444 A1 Oct. 12, 2006

(30) Foreign Application Priority Data

Apr. 12, 2005 (DE) .......................... 10 2005 016 886

(51) Int. Cl.
*G02B 13/00* (2006.01)
*H04N 5/232* (2006.01)

(52) U.S. Cl.
USPC ...... 348/346; 348/333.02; 348/354; 348/355; 348/356

(58) Field of Classification Search ............. 348/333.02, 348/346, 354–356
See application file for complete search history.

(56) References Cited

U.S. PATENT DOCUMENTS

| | | | |
|---|---|---|---|
| 5,067,020 A | 11/1991 | Funston | |
| 6,327,440 B1 * | 12/2001 | Taniguchi et al. | 396/436 |
| 6,433,824 B1 | 8/2002 | Tanaka et al. | |
| 7,324,151 B2 * | 1/2008 | Onozawa | 348/346 |
| 7,453,506 B2 * | 11/2008 | Li | 348/333.12 |
| 2001/0012072 A1 * | 8/2001 | Ueno | 348/333.02 |
| 2001/0030687 A1 | 10/2001 | Kondo et al. | |
| 2002/0067421 A1 | 6/2002 | Tanaka et al. | |
| 2002/0071141 A1 | 6/2002 | Katakura et al. | |
| 2003/0016299 A1 * | 1/2003 | Matsushima | 348/333.02 |
| 2005/0264681 A1 * | 12/2005 | Ohta | 348/345 |

FOREIGN PATENT DOCUMENTS

| | | |
|---|---|---|
| DE | 19952608 A1 | 5/2001 |
| EP | 0851668 A2 | 7/2008 |
| JP | 02-136845 | 5/1990 |
| JP | 06-113184 | 4/1994 |
| JP | 07-113944 | 2/1995 |
| JP | 08-278442 | 10/1996 |
| JP | 11196301 A * | 7/1999 |
| JP | 01-116980 | 4/2001 |
| JP | 03-179798 | 6/2003 |
| JP | 03-241072 | 8/2003 |

OTHER PUBLICATIONS

Minolta: DiMAGE Scan Multi PRO. Professional Quality Multi-Format Film,Scanner. Firmenschrift 9242-4909-01 M0701 (ME-E) A1, Osaka Japap: Minolta Co. Ltd. 2001.5 Seite "Minoltas exclusive focusing System."

(Continued)

*Primary Examiner* — Anthony J Daniels
(74) *Attorney, Agent, or Firm* — Arent Fox, LLP

(57) ABSTRACT

A method for focussing a film scanner provides for selecting a plurality of partial regions of the picture to be scanned for the purpose of focus monitoring. During the focussing of one of the selected partial regions, the focussing of the other partial regions is simultaneously monitored. The monitoring is effected for example by simultaneous representation of the partial regions on a monitor screen, and/or by evaluation of the frequency and amplitude conditions of the partial regions. An optimum focal point is set if all the selected partial regions are simultaneously set sharply.

6 Claims, 3 Drawing Sheets

OTHER PUBLICATIONS

PV Information: Neuheiten aus der World of Imaging pv Jun. 2005, v.17 Mar. 2005 Prophoto GmbH, Frankfurt/Main. Blatt3: Asbchnitt zu Canon Prima Super 130 u DAte, Blatter 11 bis 12. Abschnitt zu Pentax ist DS.

Cannon: Power Shot Technology Guide Sring, Summer 2004, Firmenschrift 0042W402,Feb. 2004, U.S.A. Cannon, Inc. 2004.S.6. isaps TechnologymS.7, High-Speed, AE/AF/AWB.S 1-, Multi-Point Ai AF, S.14, Hybrid AF-System.

Olympus: Fragen and Antworten zur Digitalfotografie.Digital Library, vol. 4, Firmenschrift, Olympus Optical Cop. (Europa) GmbH), 2002.S.84,AF-Messfeld, S.87, Autofokus, S.120, Mehrfeld-Autofokus.

Doswald, Daniel, et al.: A30 Frames/s Megapixel Real-Time CMOX Image Processor.In: IEEE Journal of Solid-State, Circuits, vol. 35, No. 11, Nov. 2000, S.1732-1743, S.1736-1737, IV Autofocus.

Delbruck, Tobi: Silicon REtina of Autofocus. In: IEEE International Symposium on Circuits and Systems.ISCAS 2000, May 28-31, 2000m Genf, S.IV-393, Abschnitt 1, Algorithm.

First Office Action in Chinese Application No. 200610074099.5 mailed Aug. 1, 2008.

Second Office Action in Chinese Application No. 200610074099.5 mailed Feb. 28, 2009.

Third Office Action in Chinese Application No. 200610074099.5 mailed May 3, 2012.

Fourth Office Action in Chinese Application No. 200610074099.5 mailed Jan. 5, 2012.

Office Action in Japanese Application No. 2006-109758 mailed Mar. 1, 2011.

Search Report and Opinion in European Application No. 06300250.5 mailed Nov. 6, 2009.

Office Action in European Application No. 06300250.5 mailed Jun. 24, 2011.

Minolta. "Minolta Dimage Scan Multi Pro Film & Slide Scanner", retrieved from the internet <http://www.imaging-resource.com/SCAN/DSMP/DSMA.HTM> on Dec. 4, 2012.

English abstract of Japanese Patent Publication No. 02-136845, dated May 25, 1990.

* cited by examiner

METHOD FOR FOCUSING A FILM SCANNER AND FILM SCANNER FOR CARRYING OUT THE METHOD

This application claims the benefit, under 35 U.S.C. & 119 German Patent Application 102005016886.8.

BACKGROUND OF THE INVENTION

Film scanners, which are also referred to as telecine, are used to scan cinematographic films and convert them into analogue or digital electrical picture signals. The electrical picture signals can then be stored and duplicated in different formats on suitable media.

During the scanning of the cinematographic films, the film material has to be scanned in such a way that as far as possible no information of the original picture is lost. This requires optimally focusing the scanning device onto the film material.

The films are guided picture by picture or continuously in a guide of the film scanner. The guide has a window, which is also referred to as a film gate. Through the film gate, a film to be scanned is trans-illuminated from one side. A scanning unit of the film scanner is situated on the other side of the film gate. The scanning unit is assigned an optic having adjustable focusing.

In order to set the correct focus position of a film scanner for the scanning of a cinematographic film, generally a picture detail from the centre of a film picture is represented in enlarged fashion. Since not all film pictures of cinematographic films have sharp contours for focusing at every location in the pictures, the focus of the film scanner is set on the basis of the structure of the film grain of the film material. In order to facilitate this, the aperture gain may additionally be increased. The aperture gain is a frequency-dependent signal gain. In this case, the sum of the individual coefficients of a matrix multiplication between an aperture matrix and corresponding pixel values which correspond to the relative position within the matrix is calculated. The electrical signals of the scanned picture have different frequency components that are dependent on the picture content. In this case, fine structures generate high-frequency signal components and coarse structures generate low-frequency signal components. The frequency distribution of the signal of the overall picture can be represented by means of a waveform graph. The waveform graph shows the different frequencies of the picture on the X axis and the respectivie amplitude for the different signal frequencies on the Y axis. The height of the amplitude is in this case a measure of the resolution obtained in the picture and is thus coupled directly to the focus setting. For optimum focusing, the proportion of high-frequency signal components is at a maximum.

Different carrier materials of the films to be scanned flex to different extents or bend differently when they run via the film gate. The bending is caused for example by the heat of the light source, which brings about mechanical stresses on account of the thermal expansion of the film material. If the depth of focus, that is to say the region of sharp imaging of the optic, of a scanning unit is not large enough, it can happen that a region of the film picture to be scanned is already imaged sharply onto the image sensor of the scanning unit, but other regions are not yet imaged sharply. By way of example, it may be that only the edges of the film picture are imaged sharply, but the centre is not, or vice versa. In order to set the focus correctly, the user has to jump back and forth between positions in the different regions of the film picture in order to obtain the optimum setting.

In conventional methods for setting the focus of film scanners, by way of example only picture regions of the horizontal and vertical edges of the film picture are taken into account for a correct setting. In order to simplify the setting, a partial region or detail of the film picture to be scanned is represented in enlarged fashion on a screen of the scanning device. An overview picture may additionally be represented.

In order to check the focus position both in the centre and at the edges, the enlarged partial region has to be shifted in order thus for example successively to check the sharpness at the right-hand edge of the picture, in the centre of the picture and at the left-hand edge of the picture and, if necessary, to readjust the focus position. In the case of setting the focus with the aid of the high-frequency component, in the waveform graph, it is attempted to set the focus such that the amplitude of the high frequency components in the picture regions are maximal both in the centre and at the edges of the film picture.

The sequential sequence during the focusing is. relatively time-consuming. Moreover, the user has in view in each case only the region that is currently to be set.

SUMMARY OF THE INVENTION

It is one aspect of the invention to provide a focussing method for a film scanner having a scanning unit and an optical unit with a variable focus in which the operability is improved and the expenditure of time for focussing is reduced.

Further developments and aspects of the method are specified in the dependent patent claims.

The method according to the invention provides for selecting partial regions of the picture for focussing, and performing the focussing in the selected partial regions. In this case, during the focussing of one of the selected partial regions of the overall picture, all the selected partial regions are simultaneously monitored with regard to the picture sharpness. The focussing is effected by means of an optical unit with a variable focus, which is assigned to a scanning unit. The scanning unit converts the picture information of the film into electrical signals representing the picture content. When the focus for one partial region is changed, the focus for the other partial regions is naturally altered.

In one aspect of the invention, the simultaneous monitoring of the focussing for all the selected partial regions is effected by virtue of all the selected partial regions being simultaneously represented in corresponding display regions on a monitor screen. Each of said display regions is assigned a selected partial region of the picture to be displayed. Each selected partial region can be represented in accordance with a presetting. When the focussing is altered, the user can thus simultaneously monitor the change in picture sharpness in all the partial regions, e.g. the sharpness profile in the picture at the right-hand and left-hand edges of the picture and also in the centre of the picture simultaneously. By virtue of the simultaneous representation of more than a single detail of the picture to be scanned, the user acquires a better overview of the picture properties of the overall picture, e.g. the sharpness profile within the picture.

In another aspect, the partial regions or picture details which are selected for focussing are reproduced in enlarged fashion on the monitor screen. In this case, the enlargement and/or the resolution of the partial regions can preferably be set by the user.

In yet another aspect, the overall picture is represented as background behind the selected partial regions on the monitor screen. In this case, the selected partial regions are overlaid on the overall picture. The user can thus advantageously keep an overview of the entire picture and thus establish for example if the picture content has intentional lack of sharpness. In this case, the user can select other suitable partial regions. Moreover, the user obtains information about the position of the picture details.

In another aspect, the frequency distribution of the electrical signal is used for focussing. In this case, the representation—known per se—of the frequency-amplitude profiles of the picture content is generated and represented in parallel for each of the selected partial regions. In this case, the focus is set whilst monitoring the frequency-amplitude profiles of all the selected regions. If the high-frequency component of the frequency-amplitude profiles has a maximum at the same time for all the partial regions, the focus is set optimally. In another aspect of the method, the frequency-amplitude profiles may additionally be inserted into enlarged the partial regions or region on the monitor screen.

An automatic method according to the invention compares the frequency-amplitude information of the electrical picture signal for all the selected regions when passing through the focussing range of the optical unit of the scanning device. In this case, a statistical optimization is effected for all the regions. This may provide for example for on average all the partial regions to be focussed optimally if the frequency-amplitude profiles of all the partial regions have the largest proportion of high frequencies that can be obtained simultaneously. The focussing is ended when the sum of the high-frequency signal components of all the selected partial regions is at a maximum. The frequency starting from which the higher frequency components of the signal are taken into account may be able to be set by the user. It is dependent on the film material to be scanned and the properties of the scanning unit and also the optical unit.

Whereas in the case of film scanners having line scanners as a scanning unit, the sharpness profile only has to be checked in the direction of the scanning line, the selection of further details, such as e.g. at the four, corners of the picture, may be advantageous for the focussing in the case of frame scanners, which scan complete pictures during scanning. Different details of a picture may be analyzed on the basis of their high-frequency signal components and then be represented in a waveform graph or frequency-amplitude profile subdivided into corresponding sections. This enables a clear representation of the sharpness profile in different picture regions.

The size and position of the corresponding details can be chosen in the form of a standard default or may either be effected by the user himself and then be stored as a further template.

The simultaneous representation makes it possible for the quality of the scanned picture to be represented clearly to the user on the basis of locally separate characteristic regions. The user can thus set more simply scanning parameters such as, for example, the focus position or else the precise position of the picture detail.

BRIEF DESCRIPTION OF THE DRAWINGS

The invention is described below with reference to the drawing, in which.

Identical or similar elements are provided with identical reference symbols in the figure.

DETAILED DESCRIPTION OF PREFERRED EMBODIMENTS

Figure 1:
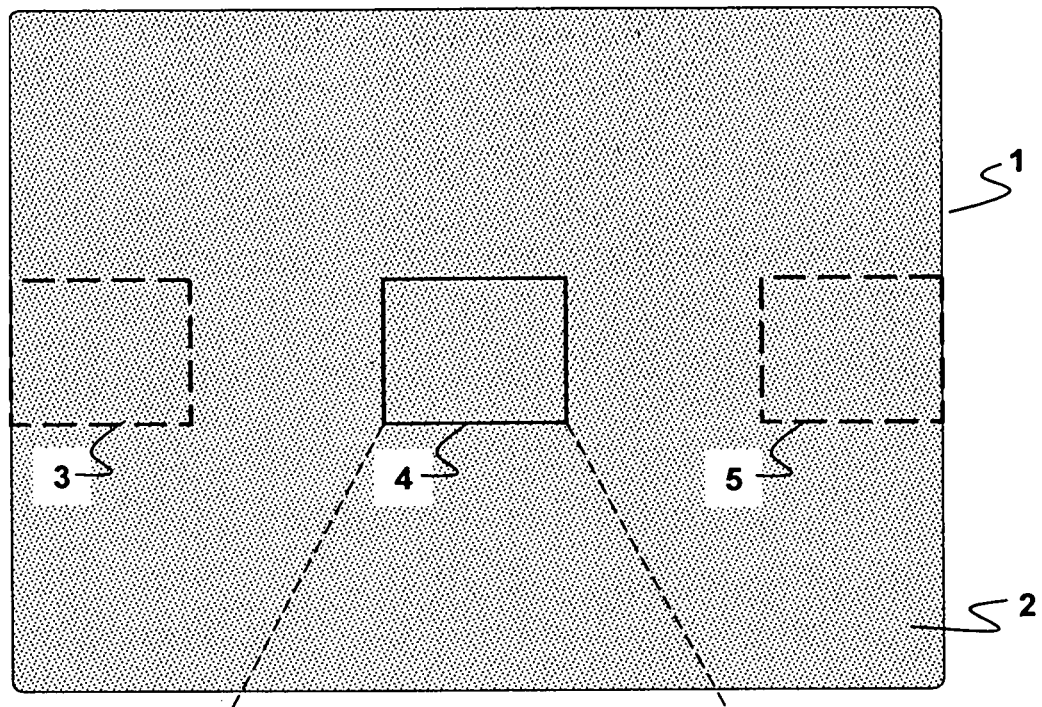
FIG. 1 shows regions to be focussed successively on a screen.

FIG. 1 illustrates a focussing method known from the prior art. It shows a picture to be scanned which is reproduced on a monitor screen 1. Three regions 3, 4, 5 in which the focussing is to be effected are marked in the picture. The focussing is effected onto the structure of the film grain, which is indicated by the dot raster 2 having the small dots in the figure. The first detail 4 to be focussed is indicated by a solid frame. The dashed frames 3 and 5 indicate that the focussing is effected successively.

Figure 2:
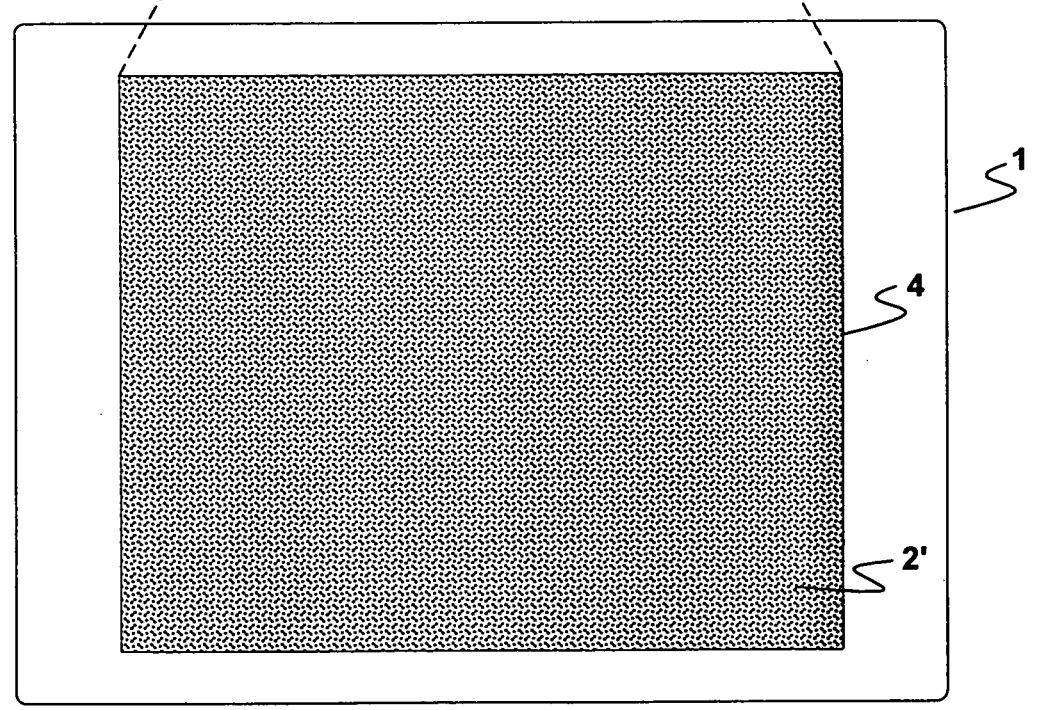
FIG. 2 shows a region to be focussed from FIG. 1, said region being represented in enlarged fashion.

In FIG. 2, the detail 4 to be focussed is represented in enlarged fashion on the monitor screen 1. The enlarged representation is indicated by the remaining edge around the region 4, and also by the dashed lines running from the region 4 in FIG. 1 to the region 4 in FIG. 2. The enlarged representation is additionally. clarified by the coarser dot raster 2' representing the structure of the film grain. As described further above, the user has to successively select the regions 3, 4 and 5 and focus the enlarged representation. As likewise described further above, it may happen in this case that a focus setting for one region is not optimal for another region.

Figure 3:
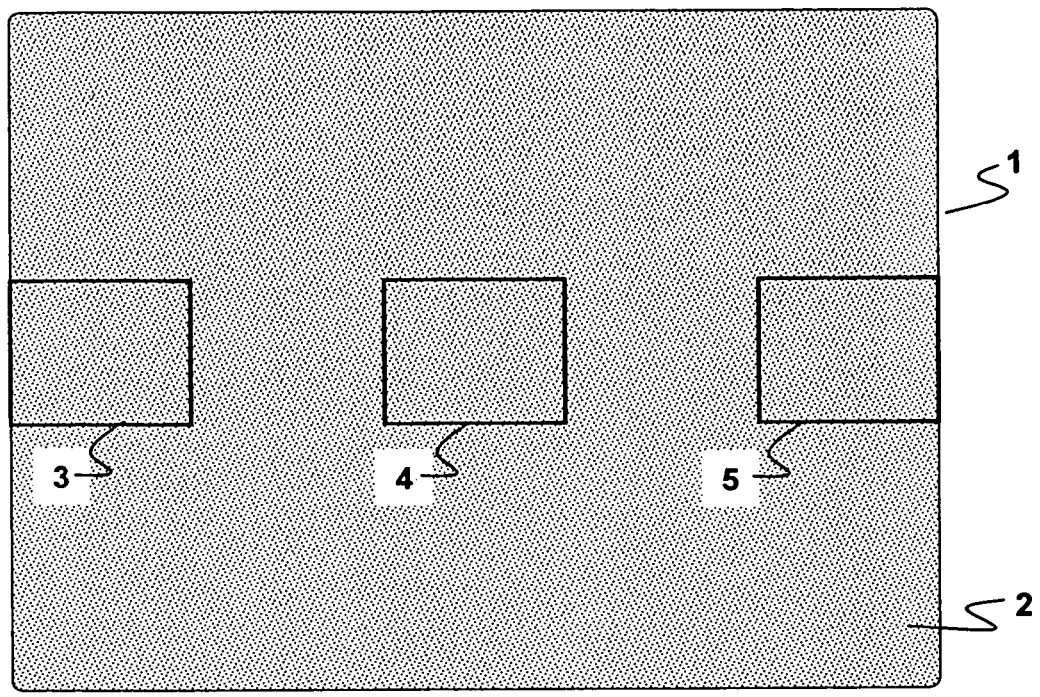
FIG. 3 shows regions to be focussed simultaneously according to the invention on a screen.

FIG. 3 shows a picture to be scanned which is reproduced on a monitor screen 1, similarly to that from FIG. 1. Three selected partial regions 3, 4, 5 in which the focussing is to be effected are marked in the picture. The focussing is effected onto the structure of the film grain, which is indicated by the dot raster 2 having the small dots in the figure. The partial regions 3, 4, 5 to be focussed simultaneously are indicated by solid frames, respectively.

Figure 4:
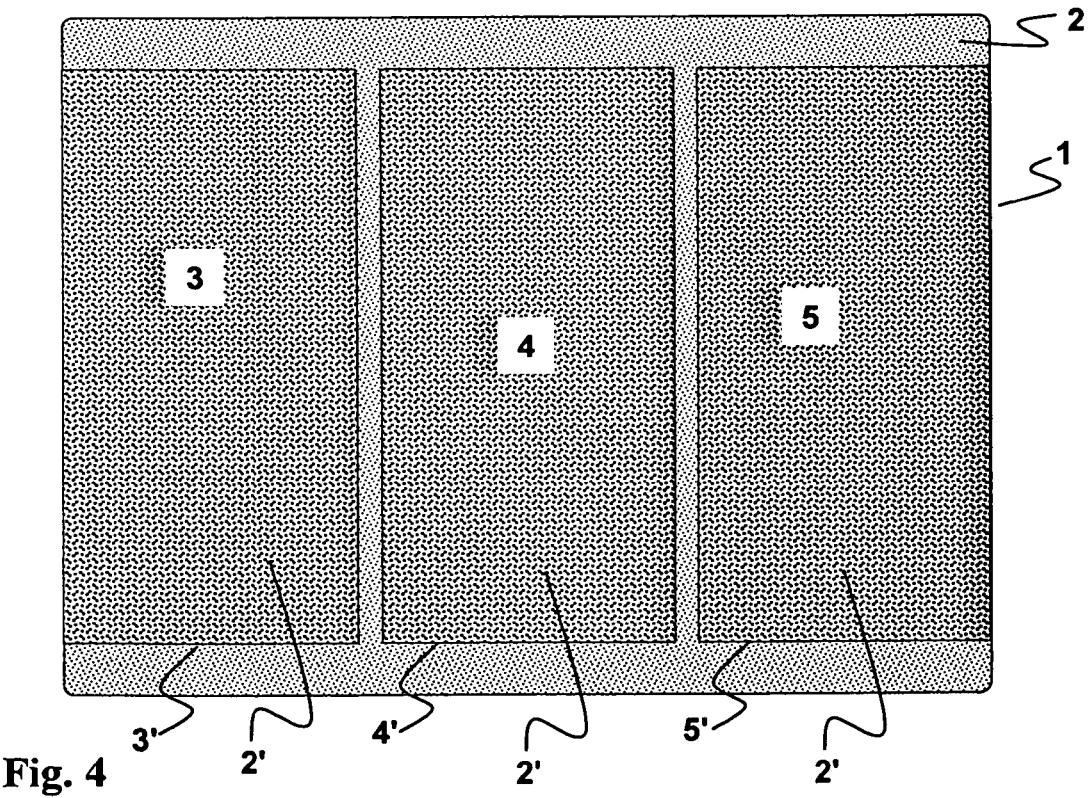
FIG. 4 shows an enlarged representation of the regions to be focussed simultaneously according to the invention.

In FIG. 4, the partial regions 3, 4, 5 to be focussed are represented in enlarged fashion in display regions 3', 4', 5' on the monitor screen 1. The enlarged representation is indicated on the one hand by the remaining edge around the regions 3', 4', 5' and on the other hand by the coarser dot raster 2'. In the event of a change in the focussing, the user can simultaneously monitor the change in the picture sharpness in all the selected partial regions.

Figure 5:
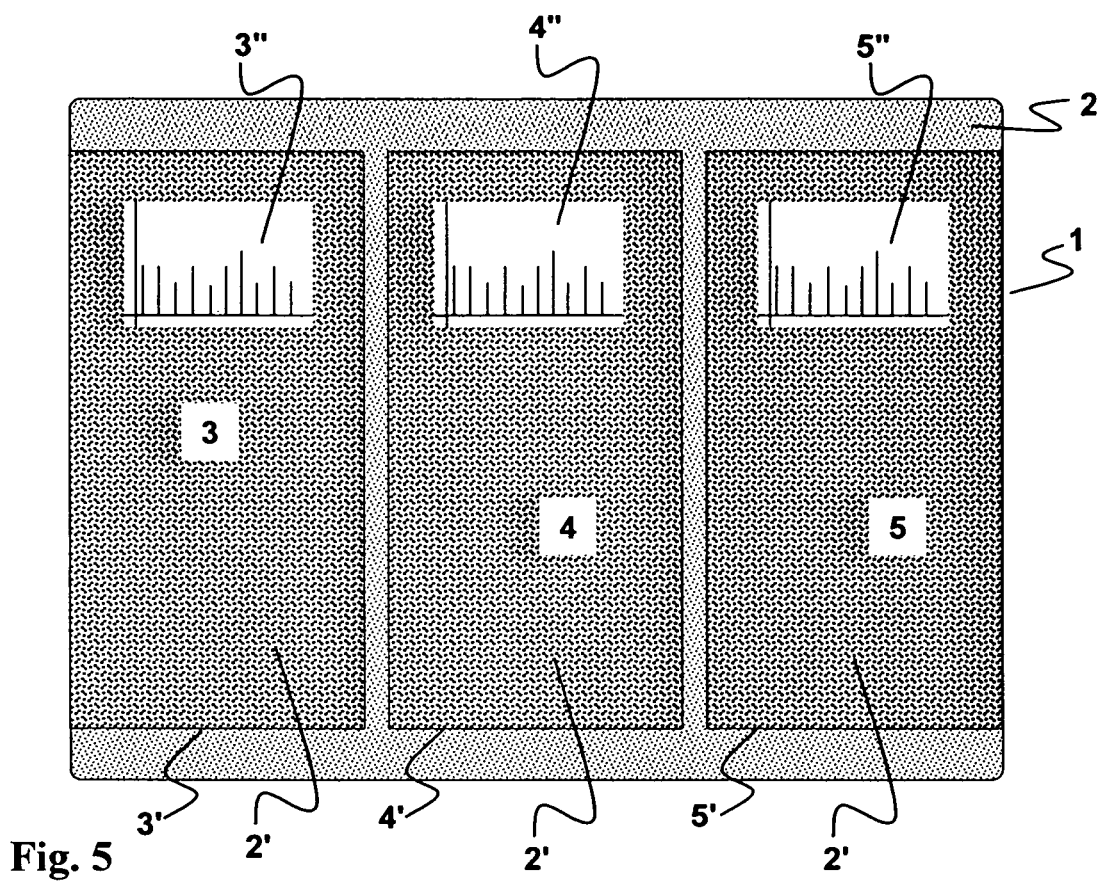
FIG. 5 shows the regions from FIG. 4 with additionally inserted waveform graphs.

FIG. 5 shows the representation from FIG. 4, the frequency-amplitude profiles in the form of a waveform graph 3", 4", 5" additionally being inserted for each of the selected partial regions in the respective display region. The focussing or the monitoring of the picture sharpness of the selected partial regions is thereby simplified further. The waveform graphs 3", 4", 5" are indicated by spectral lines having different amplitudes.

What is claimed is:

1. A method for focusing a film scanner, the method comprising: converting image information of a film image to be scanned into electrical signals in a scanning unit of the film scanner, the electrical signals representing the scanned film image, and the scanning unit being assigned an optical unit of variable focus; displaying the electrical signals of the scanned film image on a monitoring screen; selecting a plurality of subareas of the film image to be scanned for the purpose of focus control, each of the selected subareas are separated from each other selected subarea; dividing the monitoring screen into a plurality of separate display areas corresponding to each of the selected subareas that are separated from each other selected subarea; simultaneously displaying the image information for each of the selected subareas that are separated from each other selected subarea of the film image to be scanned on an enlarged scale in the separate display areas of the monitoring screen; focusing at least a first one of the selected subareas by changing the focusing of the optical unit while simultaneously monitoring a variation in the focusing of the other selected subareas, wherein focusing is determined based on a structure of a film grain; and evaluating the frequency and amplitude information of the electrical signal for each of the selected subareas while changing the focusing of the optical unit, wherein the changing of the focusing is terminated when the sum of the amplitude information of the electric signals of the selected subareas reaches a maximum for high frequencies.

2. The method of claim 1, wherein during the focusing of the at least one selected subarea, the image information of the other selected subareas is monitored, and the optical unit is configured for focusing such that each of the selected subareas are focusing in a similar manner.

3. The method of claim 1, further comprising: superimposing the frequency and amplitude information for the selected subareas into the display areas as graphs representing an amplitude-over-frequency distribution.

4. The method of claim 1, further comprising:
   displaying the complete image to be scanned as background behind the subareas displayed on a large scale.

5. The method of claim 1, wherein the focusing is performed on a structure of film grain of the film image to be scanned.

6. A film scanner set up to carry out the method according to claim 1.

* * * * *